(12) United States Patent  
Norrie et al.

(10) Patent No.: US 7,454,554 B1  
(45) Date of Patent: Nov. 18, 2008

(54) BINARY BASE ADDRESS SEARCH DEVICE AND METHOD

(75) Inventors: Christopher I. W. Norrie, San Jose, CA (US); Christopher Bergen, Cupertino, CA (US); Robert Divivier, San Jose, CA (US); Thomas J. Norrie, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 293 days.

(21) Appl. No.: 11/395,715

(22) Filed: Mar. 31, 2006

(51) Int. Cl.  
*G06F 13/00* (2006.01)  
*H04L 12/56* (2006.01)  
*G06F 13/14* (2006.01)

(52) U.S. Cl. .................. 710/316; 370/360; 370/392

(58) Field of Classification Search .............. 710/316  
See application file for complete search history.

(56) References Cited

U.S. PATENT DOCUMENTS

| | | | | |
|---|---|---|---|---|
| 5,915,097 | A * | 6/1999 | Chao | 709/238 |
| 6,810,037 | B1 * | 10/2004 | Kalapathy et al. | 370/392 |
| 7,124,200 | B2 * | 10/2006 | Sato et al. | 709/239 |
| 2005/0220129 | A1 * | 10/2005 | Boyd | 370/428 |
| 2006/0117126 | A1 * | 6/2006 | Leung et al. | 710/306 |
| 2006/0174048 | A1 * | 8/2006 | Ohara et al. | 710/305 |
| 2007/0097948 | A1 * | 5/2007 | Boyd et al. | 370/351 |
| 2007/0097950 | A1 * | 5/2007 | Boyd et al. | 370/351 |
| 2007/0147359 | A1 * | 6/2007 | Congdon et al. | 370/360 |
| 2007/0183393 | A1 * | 8/2007 | Boyd et al. | 370/351 |

* cited by examiner

*Primary Examiner*—Paul R. Myers  
*Assistant Examiner*—Ryan M Stiglic  
(74) *Attorney, Agent, or Firm*—Michael R. Hardaway; Glass & Associates

(57) ABSTRACT

A base address matching device and method are disclosed. In a switching device having a plurality of input/output ports, a routing device has been described that has an array of registers in which each register holds content associating an address with one of the input/output ports in the switching device and elements of the content in the array of registers are pre-sorted into a specified order, and an address matching element that has a plurality of comparators that are electrically coupled to selected registers in the array of registers. The base address matching element is able to select a matching address from the content of the array of registers and to direct a communication packet to one of the ports in the switch by matching the target address in the packet to an address in the content of the register in the array of registers associated with the port.

22 Claims, 7 Drawing Sheets

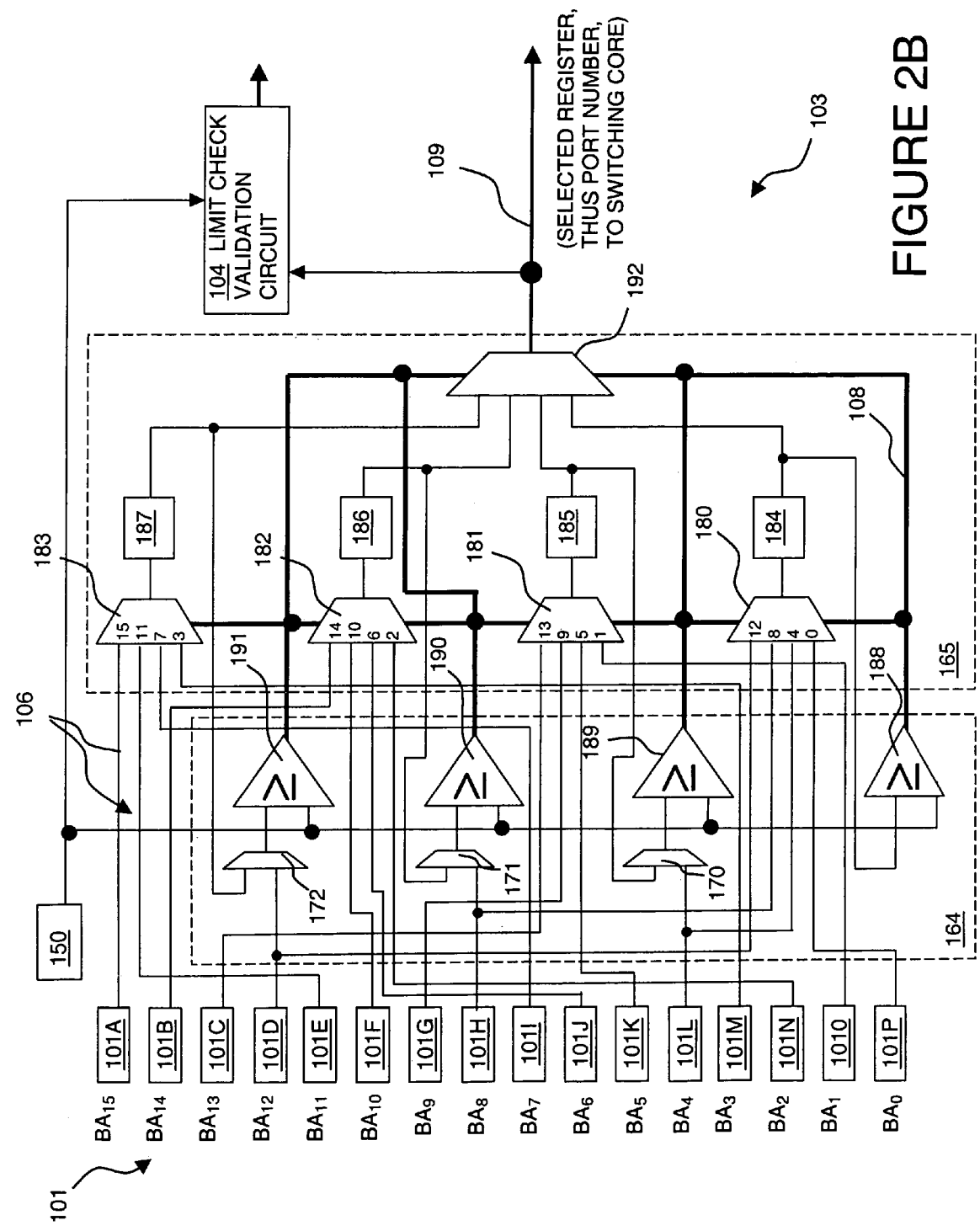

BINARY BASE ADDRESS SEARCH DEVICE AND METHOD

BACKGROUND OF THE INVENTION

Peripheral Component Interconnect (PCI) Express is a third generation Input Output (3GIO) system that implements a serial, switched-packet, point-to-point communication standard at the system level. PCI Express has achieved many advantages over the prior shared bus system, such as quality of service (QoS), high speed peer-to-peer communication between external devices, adaptability, and low pin counts. The basic PCI Express architecture includes a root complex, a PCI Express switch chip, and various external devices. So far, PCI Express switching has only been implemented in a limited number of external devices.

One three-port PCI Express serial switch performs simultaneous comparisons of the target address value of an incoming data packet with the addresses of all possible directly-connected external devices. Since each external device's addressing is defined by a base address and a limit address, there are six comparisons performed for each port. Communication packets can arrive at any of the three ports, so as many as 18 comparisons can be required to be performed, in parallel, within the PCI Express switch, requiring the implementation of sufficient comparators to accomplish the simultaneous comparisons.

However, in recent years, as the speed of processors has increased and the size of processing systems has reduced in an unprecedented rate, the demand for more external devices has also increased. PCI Express serial switches will develop to accommodate more ports and thus more external devices. As port counts grow, though, the internal circuitry grows exponentially. A sixteen port switch, for example, can require 512 or more base and limit address comparisons for an incoming communication packet, using conventional switch architecture. Switches having 512 comparators to implement the comparisons are undesirable since comparators take up chip space, consume power, and increase latency of the system.

Thus, there is a need for a method and apparatus that will accommodate connection of a large number of external devices to a serial switch without using an exponentially increased number of comparators and registers. The method and apparatus must achieve high performance, meaning a high switching rate, at the same time.

SUMMARY OF THE INVENTION

A device and method are disclosed herein that accommodates the connection of a large number of external devices to a switching device without using an exponentially increased number of comparators and registers. The device and method achieve a rapid switching rate while without entailing the increased register and comparator count.

A base address matching device and method are disclosed. In a switching device having a plurality of input/output ports, a routing device has been described that has an array of registers in which each register holds content associating an address with one of the input/output ports in the switching device and elements of the content in the array of registers are pre-sorted into a specified order, and an address matching element that has a plurality of comparators that are electrically coupled to selected registers in the array of registers. The base address matching element is able to select a matching address from the content of the array of registers and to direct a communication packet to one of the ports in the switch by matching the target address in the packet to an address in the content of the register in the array of registers associated with the port.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

FIG. 2B illustrates a logic diagram of a base address matching logic element in a routing device in accordance with an embodiment of the present invention.

DETAILED DESCRIPTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description, numerous specific details are set forth in order to provide a thorough understanding of the present invention. However, it should be understood by one of ordinary skill in the art that the present invention may be practiced without these specific details. In other instances, well-known methods, procedures, components, and circuits have not been described in detail so as not to unnecessarily obscure aspects of the present invention. At times, concepts disclosed in this discussion of embodiments of the present invention will be made more readily apparent by reference to the Figures.

Figure 1:
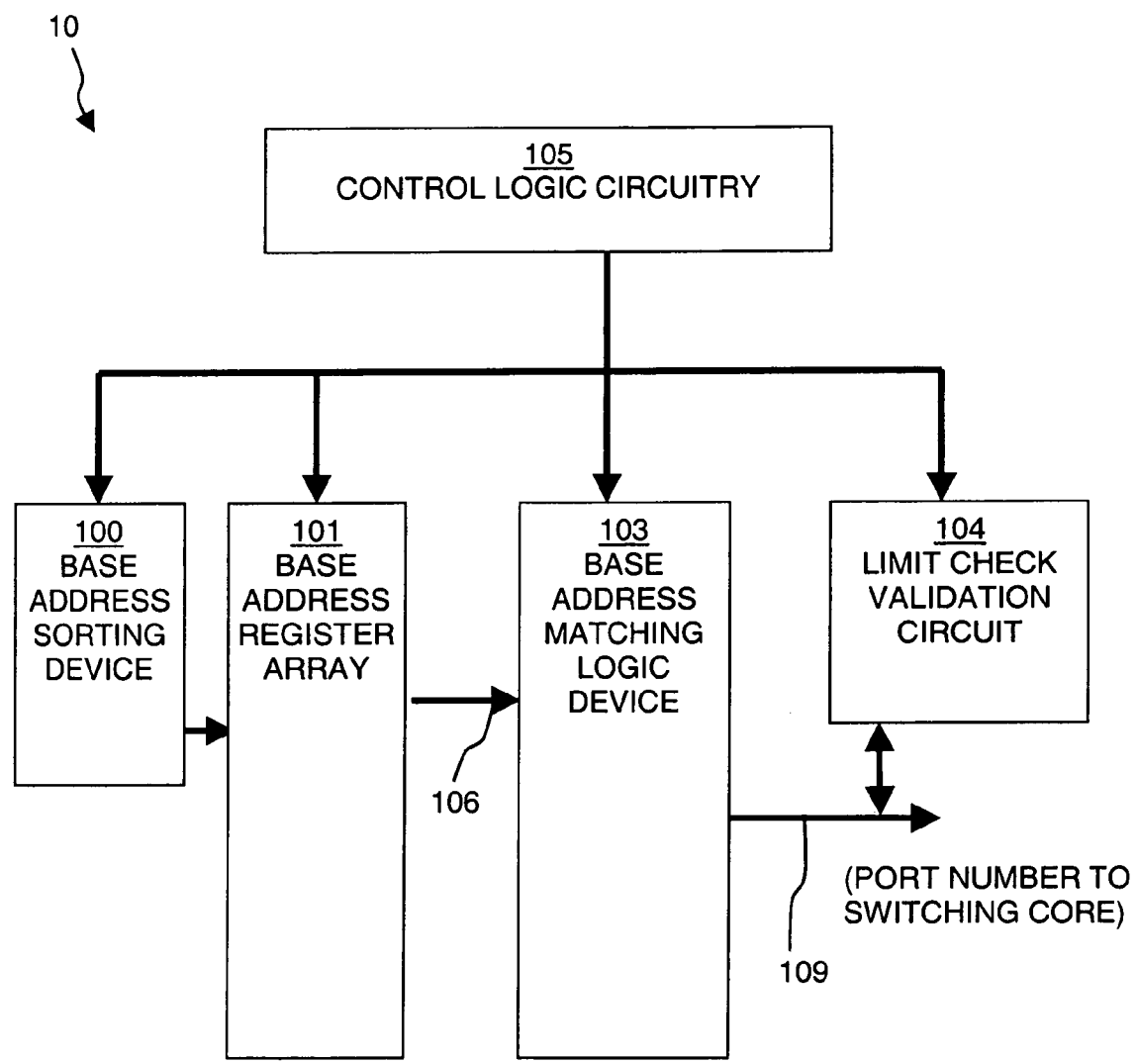
FIG. 1 illustrates a routing device in a switching device in accordance with one embodiment of the present invention.

FIG. 1 illustrates a block diagram of a routing device in accordance with an embodiment of the present invention. The present embodiment of the present invention is envisioned for implementation in a switching device with multiple ports. This embodiment is intended to function in a PCI Express switch that is enabled, upon receiving a communication packet with a target address header, to rapidly scan base address registers that have been pre-sorted into a specified order, such as a descending order, for example, in which the base address registers are considered logically from the numerically largest base address to the smallest. The sorting of base addresses for the purpose of rapid binary search switching in a PCI Express switch is described at length in the related and co-pending U.S. patent application Ser. No. 11/395,918, entitled "Method And Device For Base Address Sorting And Entry Into Base Address Registers" filed simultaneously with the present application, assigned to the assignee of the present application and incorporated by reference herein in its entirety.

In FIG. 1, routing device 10 includes control logic circuitry 105, a base address sorting device 100, a base address register array 101, a base address matching logic device 103, and an limit check validation circuit 104. Routing device 10 is located at the ingress side of each port of the multi-port switching device to route a received communication packet into the correct port and thus to the correct external device. It is noted that relational terms such as location, above, below, near, and the like, are used herein in a logical sense. The terms do not necessarily imply a physical relationship or proximity of elements of embodiments of the present invention.

In the present embodiment, base address sorting device 100 communicates with base address matching logic device 103. Base address matching logic device 103 communicates with limit check validation circuit 104. Control logic circuitry 105 is electrically connected to base address sorting device 100, base address matching logic device 103, and limit check validation circuit 104 via internal links 106 for controlling the operations of these devices. In one embodiment, control logic 105 is implemented as a portion of routing device 10. In another embodiment, it is implemented as a function of the switch core of the switching device.

It is noted here, that this discussion refers to use of embodiments of the present invention in a Peripheral Component Interface Express (PCI Express) switch operating as part of a PCI Express bus. PCI Express communications, it is noted, are switched-packet serial communications, meaning that information communicated in PCI Express is contained in a packet that includes a header having an address and, if data is being communicated, a payload. Because a header is added at a transaction layer in the PCI Express structure, a packet containing data and a header is commonly referred to as a transaction layer packet (TLP).

However, embodiments of the present invention are not limited to such applications. The term "switching device" is used to designate a number of devices enabled to switch communication packets. References to "PCI Express switch" or PCI Express switching can also be applied to other embodiments.

It is also noted that a "base address register," as referred to in this description, denotes a register that holds a base address, a limit address, and a port designation or name. Since a bus number can also be used to route some types of packets in a PCI Express serial switch, a bus number can be included in the contents of a base address register, either in lieu of, or in addition to, base and limit addresses.

It is also noted that PCI Express communications are point-to-point, meaning that only the intended receiver receives any communication in normal operation. However, the term "bus", normally denoting a collection of communication lines connected to any number of communicating devices, is used in this description is to mean any collection or grouping of communication lines between a two or more devices employing PCI Express serial communication as well as a collection of lines forming a parallel bus such as AGP or PCI, for example.

In embodiments of the present invention, such as that illustrated in FIG. 1, an array of base address registers, having one register for each other port in a switching device, is assigned to each port connected to an external device with which the switching device communicates. At each port in a three-port switch, for example, there are three base address registers for a total of nine. In a large port-count switch, such as one having sixteen ports, for example, each port has an array of sixteen base address registers, for a total of 256. As discussed above, each base address register contains a port name and the base and limit addresses assigned to external devices connected, either directly or indirectly, to its named port. The array of base address registers is encountered by the routing of an incoming PCI Express packet and the incoming packet is directed to the named port of the base address register whose address contents encompass the target address contained in the packet's header, e.g., a matching address.

It is noted that addresses can be many binary bits in length. Embodiments of the present invention are implemented with any length of address in use, however, in this description of embodiments of the present invention, addresses are considered to be up to 44 bits in length.

For a communication packet to be routed to a device by a switch, such as is referred to in reference to FIG. 1, the target address in the packet header must lie between the base address and the limit address assigned to the port that is connected to the device. Each port in a switching device is connected to only one external device but an external device can be another switch or a bridge connected to additional devices.

A PCI Express switch, in this embodiment of the present invention, is able to dynamically reassign addresses and address ranges to the ports in the switch. One example of a reason to dynamically reassign addresses is a requirement by the operating system to increase a memory allocation, such as when a software application discovers a need for more memory space than was allocated to it at system start up.

It is noted here, again, that embodiments of the present invention perform a rapid binary search of base addresses. The rapid binary search utilizes a sorted array of base addresses in the array of base address registers. The insertion of new base addresses and the subsequent sorting of the base addresses, performed by base address sorting machine 100, is described fully in the aforementioned co-pending application Ser. No. 11/395,918.

Referring still to FIG. 1, in an embodiment of the present invention, a communication packet containing a target address intended for a device connected to a port in the switch, arrives at another port in the switch. Under the control of control circuitry 105, base address matching logic element 103 communicates 106 with base address register array 101 to use the sorted list of base address registers to determine which external device is the intended target of each incoming packet containing a target address. A search for the proper base address register involves a comparison of the packet header target address and the base addresses contained in the base address register array 101. When the base addresses in the array of base address registers are sorted in descending order, for example, the largest base address register encountered whose base address is smaller than the target address is the base address register of interest. Embodiments of the present invention provide a device and a method that avoids a comparison of each incoming target address with every base address in every base address register.

Base address matching logic 103 is enabled, in this embodiment of the present invention, to locate the matching base address rapidly and with relatively few comparators and multiplexers. When a register in base address register array 101 containing a matching base address, any address range associated with the target address is compared in limit check validation circuit 104 to the limit address in the base address register. If the matching base address is valid, meaning that the limit address is larger than or equal to the base address, and if the address range of the target address is encompassed in the available range of the base and limit addresses in the base address register, the match is deemed valid in limit check validation circuit 104. The port number associated with the match is then used by the switch core in the switching device to direct the communication packet. If limit check validation 104 determines that the match is invalid, the packet can be either redirected to the root complex of the PCI Express system or returned to the sending device.

Figure 2A:
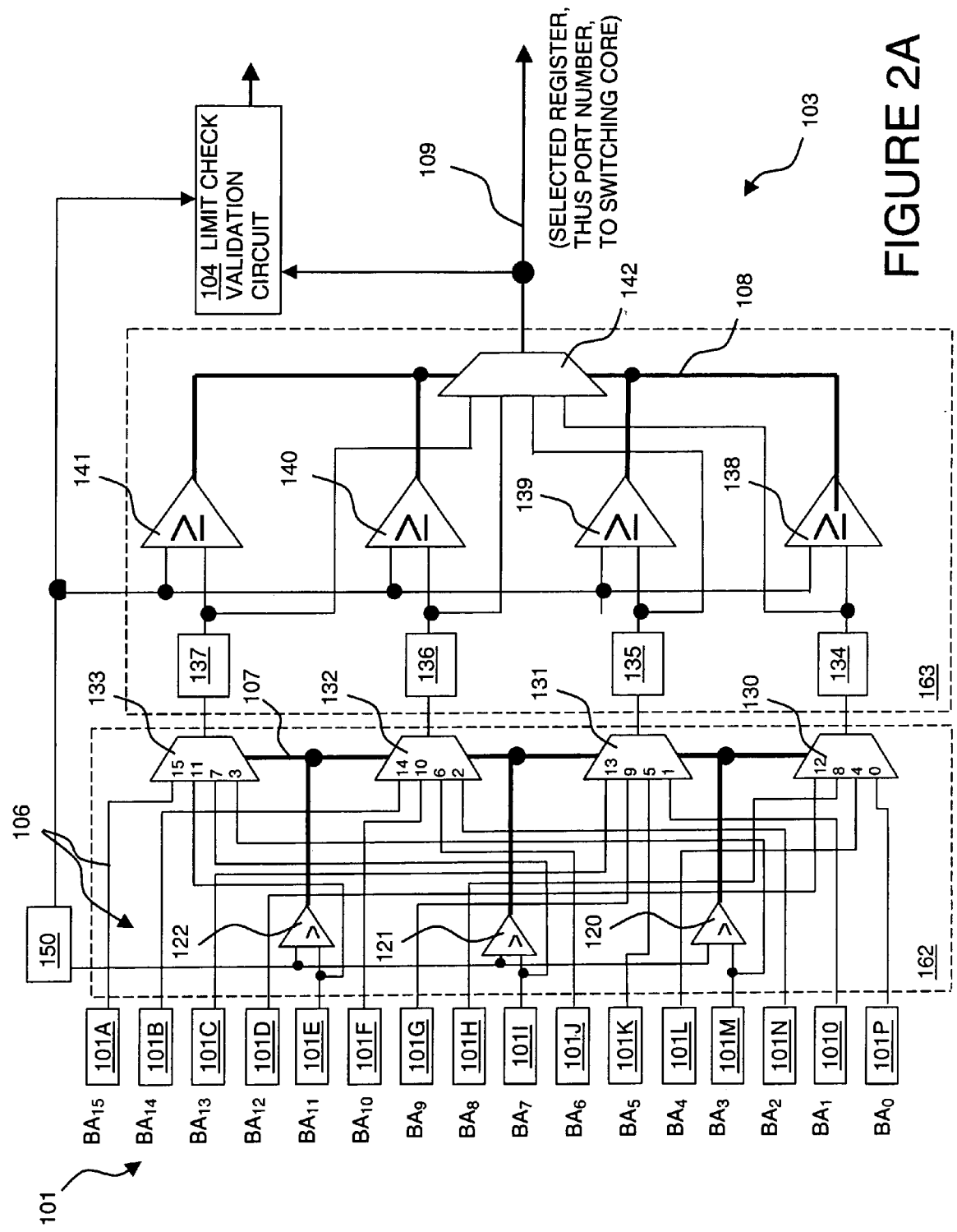
FIG. 2A illustrates a logic diagram of a base address matching logic element in a routing device in accordance with an embodiment of the present invention.

Now referring to FIG. 2A, base address register array 101 and base address matching element 103 are shown in a logical diagram. In this illustration, base address register array has sixteen base address registers 101A through 101P, containing base addresses $BA_{15}$ through $BA_0$, respectively.

It is noted here that the switching device, here illustrated with sixteen base address registers in each port's routing device, is a seventeen port switch, though embodiments of the present invention can be implemented in switching devices with any number of ports. The switch is implemented here with one upstream port and sixteen downstream ports. Because a communication packet, whose header target address indicates routing through the upstream port, is handled differently from other packets, the base address register holding address and port information associated with the upstream port is not shown in base address register array 101. Base address register array, in this illustration, contains sorted base address and port information only for downstream ports.

It is noted that the base address designations $BA_0$, $BA_1$, etc through $BA_{15}$ are used herein to denote base address register contents that are sorted on the numerical value of the base address. These designations do not imply any specific values for base addresses, limit addresses, port names, or bus numbers.

Similarly, the number of illustrated base address registers in base address register array is shown solely for the purpose of illustration. The specific number of base address registers used in implementations of embodiments of the present invention is dependent on the number of ports in the applicable switching device.

In FIG. 2A, the location of $BA_{15}$, the largest numerical value base address, is shown in the topmost, logically, base address register. This is to illustrate that embodiments of the present invention use an array of base addresses that are sorted. In this embodiment, the sorting is into a logically descending order. In another embodiment, another sort order is used.

Again referring to FIG. 2A, base address register array 101 is shown connected 106 to base address matching logic element 103. Base address matching logic element 103 is shown with a first selector 162 and a second selector 163. In a different embodiment, base address matching logic element 103 has a different internal organization of its logic.

Base address register array 101 includes, as noted above, 16 base address registers whose contents are sorted in the decreasing order of base address from top to bottom as $BA_{15}$, $BA_{14}$, $BA_{13}$, ..., $BA_1$, $BA_0$. Base address register array 101 is, in this embodiment of the present invention, divided into 4 intervals each having 4 base address registers. More particularly, the first interval includes base address registers 101P through 101M, containing base addresses $BA_0$ to $BA_3$. The second interval begins with base address register 101L holding $BA_4$ and ends with 101I holding $BA_7$. The third interval begins with base address register 101H holding $BA_8$ and ends with base address register 101E holding $BA_{11}$. The fourth interval begins with base address register 101D holding $BA_{12}$ and ends with base address register 101A holding $BA_{15}$.

First selector 162 comprises a first-phase set of comparators, 120, 121, and 122. The comparators are enabled to compare the contents of a specific base address register with a target address in a communication packet header. In this embodiment, the target address is held in register 150. Each comparator in the first-phase set is connected to and has one of its inputs from register 150 and takes the other input from one of the base address registers in base address register array 101. The specific register to which each comparator is connected is based on a specific intersection interval.

In one embodiment of the present invention, as illustrated in FIG. 2A, the number of registers in the base address register array 101 is used to determine the intersection interval. In this embodiment, the interval, in number of registers included, is determined by logarithmic function of the total number of ports in the switching device, which determines the number of registers in the base address register array. In this embodiment, the logarithmic function is $Log_2(N)$, where N is the number of registers in the base address register array. In another embodiment, however, the number of registers defining the intersection interval is the result of dividing the number of registers by an appropriate divisor. In further discussion herein, "binary logarithm" is used to designate the example of the $Log_2(N)$ function.

The topmost base address register in each interval, containing the numerically largest base address in the interval, is electrically coupled as one input to a first-phase comparator of first selector 162. More particularly, in the first interval base address register 101M, here having largest base address $BA_3$, is electrically connected to an input to first-phase comparator 120. In the second interval, base address register 101I, containing the interval's largest base address $BA_7$, is electrically connected to an input of first-phase comparator 121. In the third interval, base address register 101E, containing the interval's largest base address $BA_{11}$, is electrically connected to an input of first-phase comparator 122. Thus, the number of first-phase comparators in first selector 162 is equal to the number of intervals minus 1. Accordingly, in general, there are $log_2(N)-1$ first-phase comparators in first selector 102, for array of base address registers 101, where, again, N equals the number of registers in the array. Thus the binary algorithm of the register count, less one, $([log_2N]-1)$ determines the number of first-phase comparators in first selector 162 in this embodiment.

As discussed above, register 150, containing the target address of interest, is electrically connected to the other input of each comparator 120-122. First-phase comparators 120, 121, and 122 compare the target address, in register 150, to base addresses $BA_3$, $BA_7$, and $BA_{11}$, respectively. The output of each first-phase comparator 120-122 depends on whether the target address in register 150 is greater numerically than the respective address. In the present embodiment, each first-phase comparator issues a "true" output if the target address is greater than the associated base address in each first-phase comparator's connected base address register. In another embodiment, the comparators issue a "false" output if the target address is not greater than the respective base address. Still other embodiments produce differing combinations of target address/base address relationships in relation to true/false outputs.

Still referring to FIG. 2A, the outputs of first-phase comparators 120-122 control the input selection of second-phase multiplexers 130, 131, 132, and 133. Multiplexers 130-133, shown here as part of second selector 163, select the inputs to second-phase comparators 138, 139, 140, and 141.

Second-phase multiplexers 130-133 are, in this embodiment of the present invention, four-input multiplexers. Each input to each of the second-phase multiplexers is connected to a single base address register, one in each of the intervals discussed above. Specifically, in this embodiment of the present invention, second-phase multiplexer 130 takes its inputs from base address register 101P in the bottom-most interval, base address register 101L in the next interval, base address register 101H in the interval after that, and from 101D in the topmost interval. The next second-phase multiplexer 131 takes its inputs from the next set of base address registers; specifically, base address register 101O in the bottom-most interval, base address register 101K in the next interval, base address register 101G in the interval after that, and from 101C in the topmost interval. The next second-phase multiplexer 132 takes its inputs from the next set of base address registers; specifically, base address register 101N in the bottom-most interval, base address register 101J in the next interval, base address register 101F in the interval after that, and from 101B in the topmost interval. The topmost second-phase multiplexer 132 takes its inputs from the next set of base address registers; specifically, base address register 101M in the bottom-most interval, base address register 101I in the next interval, base address register 101E in the interval after that, and from 101A in the topmost interval.

In FIG. 2A, the outputs of first-phase comparators 120-122 are shown connected to a bus connecting second-phase multiplexers 130-133. The outputs of first-phase comparators 120-122 determine which of the inputs each second-phase multiplexer uses to compare with the contents of register 150. In FIG. 2A, each second-phase multiplexer is shown with indications of which base address is available on each input. Second-phase multiplexer 130, for example, is shown with 0, 4, 8, and 12, indicating that base addresses $BA_0$, $BA_4$, $BA_8$, and $BA_{12}$, respectively, are the base addresses to be read on each input. Second-phase multiplexer 131 has 1, 5, 9, and 13 to indicate that base addresses $BA_1$, $BA_5$, $BA_9$, and $BA_{13}$, respectively, are the base addresses to be read on each input. Similarly, second-phase multiplexer 132 has 2, 6, 10, and 14 to indicate base addresses $BA_2$, $BA_6$, $BA_{10}$, and $BA_{14}$, and second-phase multiplexer 133 has 3, 7, 11, and 15 to indicate base addresses $BA_3$, $BA_7$, $BA_{11}$, and $BA_{15}$.

In an example of operation of the first-phase comparators and the second-phase multiplexers, a communication packet arrives at a port with a target address $TA_{NEW}$ in its header that is numerically between the base addresses represented by $BA_8$ and $BA_9$. $TA_{NEW}$ is written into register 150. Each first-phase comparator 120, 121, and 122, compares $TA_{NEW}$ with each first-phase comparator's respective specific register. $TA_{NEW}$ is larger than $BA_8$, thus it is also larger than $BA_3$ in base address register 101M connected to first-phase comparator 120. First-phase comparator 120, therefore, outputs a "true" indication. $TA_{NEW}$ is also larger than $BA_7$ in base address register 101I connected to first-phase comparator 121, so first-phase comparator 121 also outputs a "true" indication. However, $TA_{NEW}$ is smaller than $BA_9$, so it is also smaller than $BA_{11}$ in base address register 101E connected to first-phase comparator 122, so first-phase comparator 122 outputs a "false" indication.

The combination of outputs from the first-phase comparators determines which input is accepted by the second-phase multiplexers 130-133. In this embodiment of the present invention, a true, true, false output from the first-phase comparators indicates that, if a matching address is to be found for the new target address $TA_{NEW}$, it will be found in the interval above base address register 101I; 101H up to and including base address register 101E. If the first-phase comparator output had been false, false, false, the first interval 101P-101M would have been indicated. If the output had been true, false, false, the second interval 101L-101I would have been indicated. If the output had been true, true, true, the topmost interval, 101D-101A would have been indicated.

Because, in this example, the third interval 101H ($BA_8$)-101E ($BA_{11}$) is indicated, the output of first-phase comparators 120-122 causes the second-phase multiplexers 130-133 to read from the inputs connected to base address registers in the indicated interval. Second-phase multiplexer 130 reads from its third input connected to base address register 101H ($BA_8$), second-phase multiplexer 131 reads from its third input connected to base address register 101G ($BA_9$), second-phase multiplexer 132 reads from its third input connected to base address register 101F ($BA_{10}$), and second-phase multiplexer 133 reads from its third input connected to base address register 101E ($BA_{11}$). The contents of each of the third interval registers is written to the buffers 134-137, connected to each output of the second-phase multiplexers 130-133, respectively.

It is noted again that the numbers of second-phase multiplexers, the number of second-phase comparators and the number of first phase comparators are determined by the number of registers in the base address register array. In this embodiment of the present invention, the number of second-phase multiplexers is the next higher integer of the binary logarithm of the number of registers in the array, $Log_2 N$, where N is the number of registers. For example, if there are eight registers in a nine-port switch, the number of second-phase multiplexers in this embodiment would be 3. In a 32 port switch, the number of second-phase multiplexers in this embodiment of the present invention would be 5. The number of first-phase comparators is N−1, in this embodiment. In a switching device with a port count producing a non-integer binary log of N, the number is the next higher integer. It is noted here the savings in comparator and multiplexer implementation improves exponentially over prior solutions as the port count increases in larger port-count switching devices.

Referring again to FIG. 2A, the outputs of second-phase multiplexers 130-133 are connected to buffers 134-137, respectively. Each buffer 134-137 is enabled to be read as an input to second-phase comparators 138-141, respectively. The other input to each second-phase comparator is connected so as to read register 150 which contains, in the current example, new target address $TA_{NEW}$. Second-phase comparators 138-141, it is noted, output a true indication on either a greater-than-or-equal-to comparison.

Continuing the current example, second-phase comparator 138 compares $TA_{NEW}$ with base address $BA_8$. Second-phase comparator 139 compares $TA_{NEW}$ with base address $BA_9$, second-phase comparator 140 compares $TA_{NEW}$ with base address $BA_{10}$, and second-phase comparator 141 compares $TA_{NEW}$ with base address $BA_{11}$. $TA_{NEW}$ is larger than $BA_8$ but smaller than $BA_9$, $BA_{10}$, and $BA_{11}$. Therefore, second-phase comparator 138 outputs a true, but second-phase comparators 139-141 output false indications. As in the first phase in first selector 162, the outputs of second-phase comparators 138-141 control the input selection of multiplexer 142.

As shown in FIG. 2A, multiplexer 142 is also a four-input multiplexer, taking its inputs from the buffers 134-137 that contain the outputs of second-phase multiplexers 130-137. Again, the outputs of second-phase comparators 138-141 control the input selection of multiplexer 142.

In the present example, the "true, false, false, false" output of second-phase comparators 138-141 cause multiplexer 142 to accept the contents of register 134 as input. Register 134, as discussed above, contains the contents of base address register 101H, which include base address $BA_8$. In this way, the contents of base address register 101H are output by base address matching logic element 103. In addition to $BA_8$, the contents of base address register 101H include a limit address and a port name or number.

Continuing the present example in reference to FIG. 2A, the limit address contained in base address register 101H is compared to target address $TA_{NEW}$. If the target address and its associated address range, if any, are encompassed by the limit address contained in base address register 101H, and thus output by multiplexer 142, then the match is determined to be valid and the communication packet is forwarded to the port associated with the base address in base address register 101H. If the match is not determined to be valid, the packet is returned to its sender or referred to the root complex through the upstream port in the switching device.

If, in the continuing example, the indications output by second-phase comparators 138-141 had been different, a different input to multiplexer 142 would have been read for forwarding to the switch core. A "true, true, false" indication would have caused the multiplexer 142 to read from buffer 135. A true, true, true, false" indication would have caused the multiplexer 142 to read the contents of buffer 136, and a "true, true, true, true" would have caused the multiplexer to read buffer 137.

It is noted here that the selection, in this embodiment of the present invention, of binary logarithm of the number of ports in the switching device results in a certain number of first-phase comparators, second-phase multiplexers, and second-phase comparators. Because multiplexers require less chip space, or real estate, than comparators, embodiments of the present invention are implemented in devices for which other choices produce differing numbers of such elements as may be optimal for the application. In a PCI Express switch having three downstream ports, for example, the next integer higher than $Log_2N$ (N=3) is 2. In the example discussed in reference to FIG. 2A, the selection of 2 as the interval integer would result in one first-phase comparator, two second-phase multiplexers and two second-phase comparators, as well as a base address sorting device, in lieu of six comparators if all base address registers were to be compared simultaneously.

However, in a large port-count switch, such as the exemplary switch with sixteen downstream ports, using $Log_2N$ (N=16) results in an interval size of four. This choice of interval size results in three first-phase comparators, four second-phase multiplexers, four second-phase comparators, and a base address sorting device in lieu of 32 comparators.

It is noted that other bases of reduction can be chosen for implementation of embodiments of the present invention, resulting in other numbers of elements of the base address matching device. For example, the integer closest to the square root of the number of registers can be utilized. In the case of a port with sixteen downstream ports, as is illustrated in FIG. 2A, the square root is 4, again resulting in three first-phase comparators and four second-phase comparators. In a switching device with 32 downstream ports, however, the integer that is next higher of the square root of about 5.66 is 6. An interval of 6 results in five first-phase comparators and six second-phase comparators.

Embodiments of the present invention are not limited, however, to a two-phase selection of base address matches. In one embodiment of the present invention, implemented in a switching device with 64 downstream ports, a three-phase matching address selection is implemented using a cube root function to establish the number of comparators in each phase. The number of registers in the intersection interval is the number of registers divided by the cube root of 64, 4. This results in three comparators in the first phase, ((64/4)−1) four second-phase comparators, and four third-phase comparators.

The number of devices employed, however, do not limit embodiments of the present invention. Embodiments of the present invention encompass the scheme of multiphase comparisons in order to significantly reduce the required elements and associated chip real estate for a routing device in a switching device.

Now referring to FIG. 2B, an alternative embodiment of the present invention is illustrated. Here, base address register array 101 and base address matching element 103 are again shown in a logical diagram. In this illustration again, base address register array 101 has sixteen base address registers 101A through 101P, containing base addresses BA15 through BA0, respectively.

In FIG. 2B, base address register array 101 is shown connected to base address matching logic element 103. Base address matching logic element 103 is shown in this embodiment with a first selector 164 and a second selector 165.

Base address register array 101 includes, as noted above, 16 base address registers whose contents are sorted in the decreasing order of base address from top to bottom as BA15, BA14, BA13, . . . , BA1, BA0. Base address register array 101 is, in this embodiment of the present invention, again divided into four intersection intervals each having 4 base address registers, as discussed at length above in reference to FIG. 2A. The base address registers are, in this example, configured, loaded and sorted as in FIG. 2A.

First selector 164, however, comprises a first-phase set of multiplexers, 170, 171, and 172 and multiplexers 188-191. Second selector 165 comprises multiplexers 180-183, buffers 184-187, and output multiplexer 192. The multiplexers 188-191 are enabled, by control logic 105 in FIG. 1, to select either the contents of a specific base address registers or the contents of a buffer in buffers 184-187. The first-phase multiplexers 170, 171, 172 provide one input each to first phase comparators 189-191, respectively. Each first-phase comparator is connected to and has one of its inputs from register 150 and takes the other input from the output of first-phase multiplexer 170-172, respectively. The outputs of first-phase comparators 188-191 control the input selection of second-phase multiplexers 180-183 via control connection 108. Based on the selection driven by the first-phase comparators, second-phase multiplexers 180-183 select the content of a specific base address register in base address register 101. The content of the selected register is read into buffer 184-187, respectively.

In this embodiment, the control logic 105 enables each first-phase multiplexer to alternatively select either its connected base address register or the content of its respective buffer on alternating system clock cycles. In another embodiment, another basis for selection is chosen.

As discussed above, register 150, containing the target address of interest, is electrically connected to the other input of each comparator 188-191. In one embodiment, first-phase multiplexers 170, 171 and 172, on one clock cycle select the content of their specific base address registers to be the first input to each first-phase comparator 189, 190, and 191. First-phase comparator 188, it is noted, only receives the content of buffer 184 as its first input.

The second input of each first-phase comparator is the content of register/buffer 150. As discussed above in reference to FIG. 2A, if the target address is larger than or equal to the base address in the base address register, the comparator issues a true output and if the target address is not larger than or equal to the base address, the comparator issues a false indication. As noted above, the output of first-phase comparators 188-191 control the input selection of second phase multiplexers 180-183.

Second-phase multiplexers 180-183 are, in this embodiment of the present invention, four-input multiplexers. Each input to each of the second-phase multiplexers is connected to a single base address register, one in each of the intervals discussed above. Specifically, in this embodiment of the present invention, second-phase multiplexer 180 takes its inputs from base address register 101P in the bottom-most interval, base address register 101L in the next interval, base address register 101H in the interval after that, and from 101D in the topmost interval. The next second-phase multiplexer 181 takes its inputs from the next set of base address registers; specifically, base address register 101O in the bottom-most interval, base address register 101K in the next interval, base address register 101G in the interval after that, and from 101C in the topmost interval. The next second-phase multiplexer 182 takes its inputs from the next set of base address registers; specifically, base address register 101N in the bottom-most interval, base address register 101J in the next interval, base address register 101F in the interval after that, and from 101B in the topmost interval. The topmost second-phase multiplexer 182 takes its inputs from the next set of base address registers; specifically, base address register 101M in the bottom-most interval, base address register 101I in the next interval, base address register 101E in the interval after that, and from 101A in the topmost interval.

In FIG. 2B, the outputs of first-phase comparators 188-191 are shown connected to a bus connecting second-phase multiplexers 180-183. The outputs of first-phase comparators 188-191 determine which of the inputs each second-phase multiplexer stores in buffer 184-187. In FIG. 2B, each second-phase multiplexer is shown with indications of which base address is available on each input. Second-phase multiplexer 180, for example, is shown with 0, 4, 8, and 12, indicating that base addresses $BA_0$, $BA_4$, $BA_8$, and $BA_{12}$, respectively, are the base addresses to be read on each input. Second-phase multiplexer 181 has 1, 5, 9, and 13 to indicate that base addresses $BA_1$, $BA_5$, $BA_9$, and $BA_{13}$, respectively, are the base addresses to be read on each input. Similarly, second-phase multiplexer 182 has 2, 6, 10, and 14 to indicate base addresses $BA_2$, $BA_6$, $BA_{10}$, and $BA_{14}$, and second-phase multiplexer 183 has 3, 7, 11, and 15 to indicate base addresses $BA_3$, $BA_7$, $BA_{11}$, and $BA_{15}$.

In an example of operation of the alternative embodiment shown in FIG. 2B, a communication packet arrives at a port with a target address $TA_{NEW}$ in its header that is numerically between the base addresses represented by $BA_8$ and $BA_9$. $TA_{NEW}$ is written into register 150. At one clock cycle, each first-phase multiplexer 170-172 selects the content of its specific base address register to be the first input to its associated first-phase comparator 189-191. Each first-phase comparator 188, 189, 190 and 191, compares $TA_{NEW}$ with each first-phase multiplexer's respective specific register or, in the case of first-phase comparator 188, the content of buffer 184. It is noted that buffer 184 is cleared with each address match cycle, showing a zero content, so target address $TA_{NEW}$ is always larger than the comparison. Thus first-phase comparator 188 always issues a true in the first cycle.

In this continuing example, $TA_{NEW}$ is larger than $BA_8$, thus it is also larger than $BA_4$ in base address register 101L connected to first-phase multiplexer 170. First-phase comparator 189, therefore, also outputs a "true" indication. $TA_{NEW}$ is also larger than $BA_8$ in base address register 101H connected to first-phase multiplexer 171, so first-phase comparator 190 also outputs a "true" indication. However, $TA_{NEW}$ is smaller than $BA_9$, so it is also smaller than $BA_{12}$ in base address register 101D connected to first-phase multiplexer 172, so first-phase comparator 191 outputs a "false" indication.

As in the embodiment of the present invention illustrated in FIG. 2B and discussed above, the combination of outputs from the first-phase comparators determines which input is accepted by the second-phase multiplexers 180-183. In this embodiment of the present invention, a true, true, false output from the first-phase comparators indicates that, if a matching address is to be found for the new target address $TA_{NEW}$, it will be found in the interval at and above base address register 101H up to and including base address register 101E. If the first-phase comparator output had been false, false, false, the first interval 101P-101M would have been indicated. If the output had been true, false, false, the second interval 101L-101I would have been indicated. If the output had been true, true, true, the topmost interval, 101D-101A would have been indicated.

Because, in this example, the third interval 101H ($BA_8$)-101E ($BA_{11}$) is indicated, the output of first-phase comparators 188-191 causes the second-phase multiplexers 180-183 to read from the inputs connected to base address registers in the indicated interval. Second-phase multiplexer 180 reads from its third input connected to base address register 101H ($BA_8$), second-phase multiplexer 181 reads from its third input connected to base address register 101G ($BA_9$), second-phase multiplexer 182 reads from its third input connected to base address register 101F ($BA_{10}$), and second-phase multiplexer 183 reads from its third input connected to base address register 101E ($BA_{11}$). The contents of each of the third interval registers is written to the buffers 184-187, connected to each output of the second-phase multiplexers 180-183, respectively.

Still referring to FIG. 2B, the outputs of second-phase multiplexers 180-183 are connected to buffers 184-187, respectively. Each buffer 184-187 is enabled to be read as an input to second-phase multiplexer 192. Each buffer 184-187 is also enabled to be read as an input to first-phase multiplexers 170-171. At the second clock cycle in an address matching cycle, first phase multiplexers 170-172 select the contents of buffers 185-187 to be the first input to first-phase comparators 188-191. At the second clock cycle, the output conditions of comparators 188-191 control the input selection of second-phase multiplexer 192.

Now, because $TA_{NEW}$ is larger than $BA_8$, comparator 188 issues a true output. However, $TA_{NEW}$ is smaller than $BA_9$, $BA_{10}$ and $BA_{11}$. The comparators 189, 190, and 191 each issue a false output.

In the present example, the "true, false, false, false" output of comparators 188-191 cause multiplexer 192 to accept the contents of register 184 as input. Register 184, as discussed above, contains the contents of base address register 101H, which include base address $BA_8$. In this way, the contents of base address register 101H are output by base address matching logic element 103. In addition to $BA_8$, the contents of base address register 101H include a limit address and a port name or number.

Continuing the present example in reference to FIG. 2B, the limit address contained in base address register 101H is compared, as in earlier examples, to target address $TA_{NEW}$. If the target address is equal to or within the address range defined by the limit address contained in base address register 101H, and thus output by multiplexer 192, then the match is determined to be valid and the communication packet is forwarded to the port associated with the base address in base address register 101H. If the match is not determined to be valid, the packet is processed as an invalid packet.

Again, embodiments of the present invention are not limited to a either the two-phase selection of base address matches as illustrated in FIG. 2A or to the two cycle base address match of FIG. 2B. Other embodiments employing plurality of comparators that is smaller than the array of base address registers.

Figure 3:
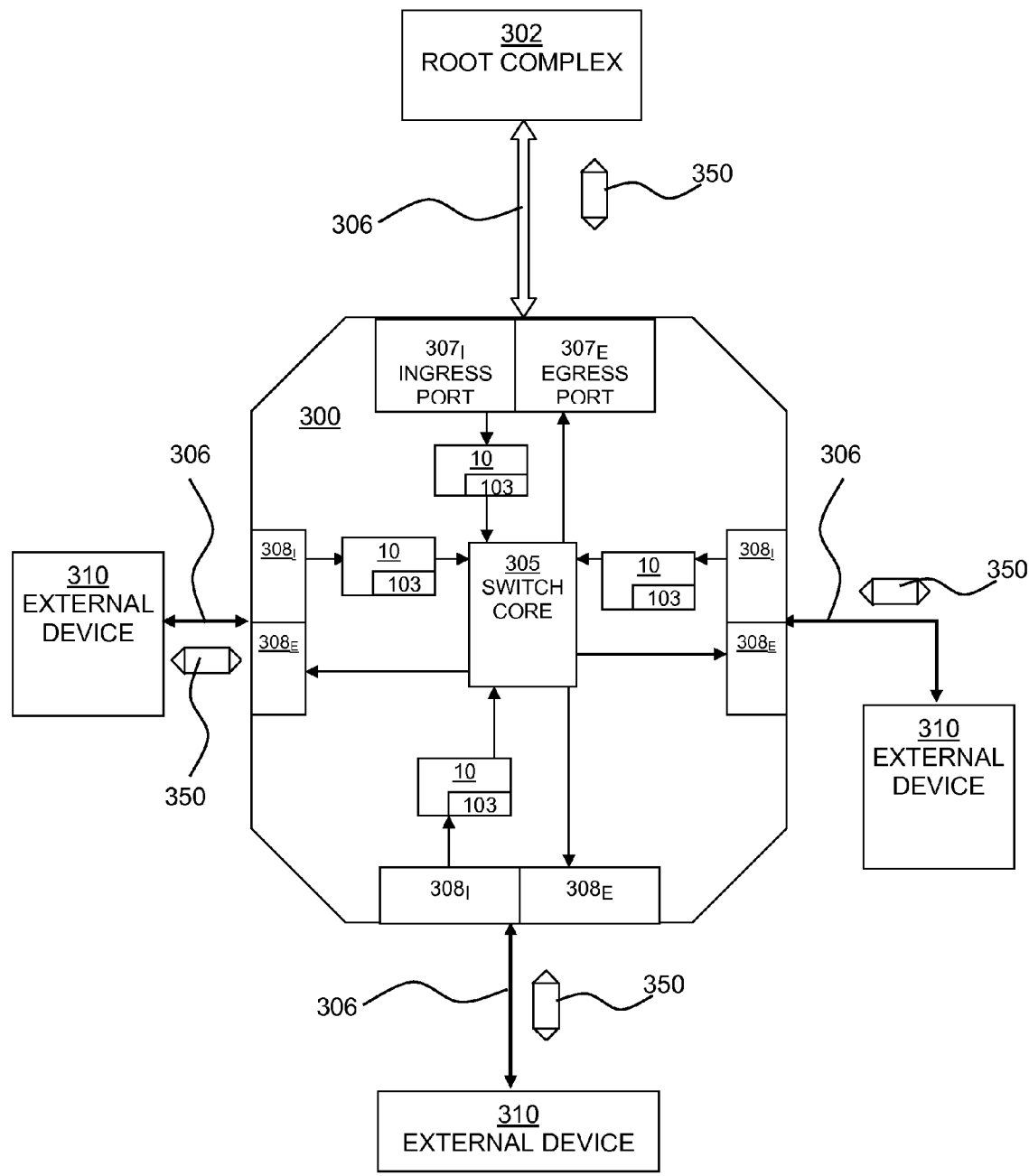
FIG. 3 illustrates a switching device that includes the base address matching logic element of FIG. 2A in accordance with an embodiment of the present invention.

Now referring to FIG. 3, a block diagram of a switching device 300 is shown. In this embodiment of the present invention, the switching device uses routing device 10 of FIG. 1 at each port to facilitate communication of the external devices 310 connected to the switch. In another embodiment, routing device 305 is centrally implemented with switch core 305.

In one embodiment of the present invention, switching device 300 is a PCI Express switch. Switching device 300 employs routing device 10 that contains address matching logic device 103. Address matching logic device 103 is electrically connected to a switch core 305. Switching device 300 communicates with external devices 310 via PCI Express links 306. As discussed previously, the term PCI Express as used in the present invention includes devices, protocols, operations that conform to the requirements of the PCI Express Base Specification. The term "PCI Express Base Specification", as used in the present application, includes all PCI Express standards, including but not limited to PCI Express Standard versions 1.0, 1.0a, and 1.1 published by PCI Signal Interest Group (PCI-SIG).

In the present embodiment, as illustrated in FIG. 3, switching device 300 is implemented as a four port switch. In another embodiment, switching device 300 includes sixteen or more ports enabled to communicate with external devices 310. In one embodiment, switching device 300 includes 15 ports downstream ports 308 and an upstream port 307. Upstream port 307 further includes ingress terminal 307I and egress terminal 307E. Ingress terminal 307I is an input terminal for receiving an incoming PCI Express communication packet from root complex 302. Egress terminal 307E is an upstream output port for sending out a communication packet routed through switching device 300 to root complex 302 or to another switching device located upstream.

Downstream ports 308 each include an ingress terminal 308I and an egress terminal 308E that are electrically coupled to switch core 305. Downstream ingress terminal 308I is used to receive communication packet 350 from external devices 310 and downstream egress terminals 308E send out communication packets to external devices 310. It is noted that, when external devices 310 are electrically connected to switching device 300, external devices 310 can send and receive PCI Express packets, through switching device 300 over PCI Express links 306, to each other without entailing upstream, root complex, time. At upstream port 307, the input terminal of routing device 10 is electrically connected to upstream ingress terminal 307I and the output terminal of routing device 10 is electrically connected to switch core 305. The output of the switch is electrically connected to egress terminal 307E of upstream port 307. Similarly, at each downstream port 308, the input terminal of routing device 10 is electrically connected to downstream ingress terminal 308I and the output terminal of routing device 10 is electrically connected to a switch of switch core 305. The output of that switch is electrically connected to egress terminal 308E of downstream port 308.

In one embodiment of the present invention, routing device 10, and its array of base address registers and control logic, is replicated at every port in switching device 300. In an alternative embodiment, however, a single implementation of the elements of routing device 10 is located with the switch core 305. In another embodiment, more than one implementation of the elements of routing device 10 is implemented, though not at every port in the switching device.

Referring still to FIG. 3, a communication packet 350 may be received at switching device 300 at upstream port 307 or at any of downstream ports 308. In the present embodiment, a communication packet 350 can be a data or other packet that is in compliance with the PCI Express standard. External devices 310 can be PCI Express devices or bridges to other types of devices. Upon receiving communication packet 350, control logic circuitry 105 determines whether the target address contained in communication packet 350 falls within the address range contained in any of the base address registers in the array of base address registers 101. If the target address contained in communication packet 350 is within the range of array of any of the base address registers 101, switching device 300 will forward the communication packet 350 to the port named in the base address register whose address range encompasses the target address.

In the present embodiment, switching device 300 is a single Integrated Circuit (IC) device that is implemented in a single semiconductor chip on which routing functions and logic of switching device 300 are implemented. This includes registers, comparators multiplexers and connection links described above. In practice, switching device 300 with base address matching logic element 103 can be implemented as a chipset which is a device coupled to a Central Processing Unit (CPU) to perform the desired system functionality. In another embodiment, switching device 300 can be implemented on an Application Specific Integrated Circuit (ASIC).

Figure 4:
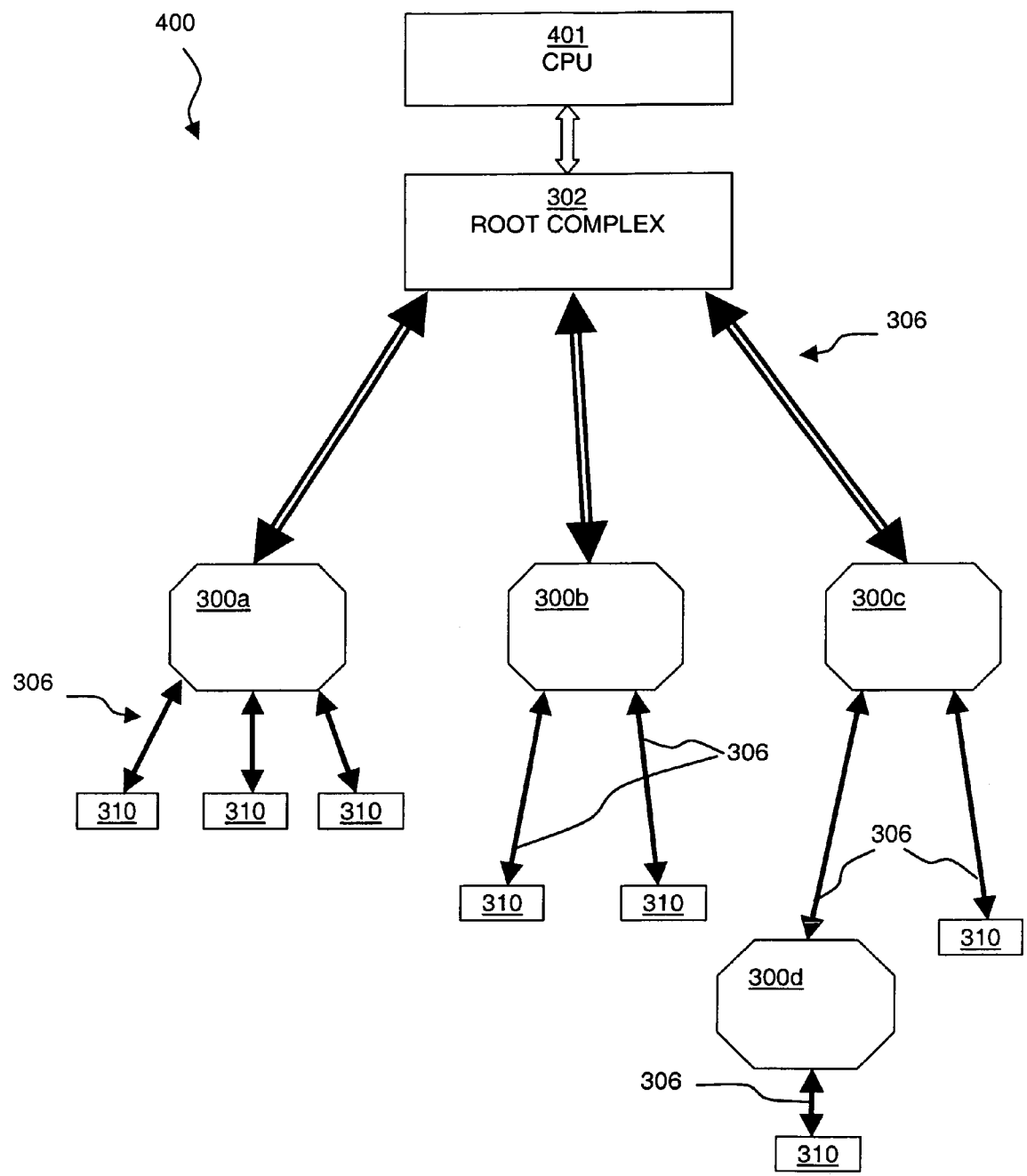
FIG. 4 illustrates a schematic diagram of a PCI Express system that includes the switching device of FIG. 3 and external devices in accordance with one embodiment of the present invention.

Now referring to FIG. 4, a schematic diagram of a typical PCI Express system 400 is shown that uses switching device 300 to connect external devices 310 with root complex 302 and with each other. Switching device 300 includes a routing device 10 that contains base address sorting device 100. In the embodiment that is shown in FIG. 4, switching device 300 with routing device 10 is implemented in a PCI Express system 400. PCI Express system 400 is a communication system which is typically found in computing system that includes a Central Processing Unit (CPU) 401, a root complex 302, switching device 300 and one or more external devices 310.

The elements of PCI Express system 400 interconnected by PCI Express link 306 are the root complex 302, the switching device 300, and the external devices 310. CPU 401 is electronically connected to root complex 302 but the link between them is not, in this embodiment, a PCI Express link. The heart of PCI Express system 400 is root complex 302. Root complex 302 is connected to PCI Express switching device 300 by PCI Express link 306. External devices 310 communicate to root complex 302, and thus CPU 401, via switching device 300. In PCI Express system 400, external devices 310 can independently communicate peer-to-peer with each other directly via switching device 300. PCI Express system 400 uses communication packets 350 to communicate to root complex 302, switching device 300, and external devices 310 connected thereto. Communication packets can be generated by the root complex 302, switching device 300, or external devices 310.

Referring further to FIG. 4, the controller of PCI Express communications in system 400 is either CPU 401 or root complex 302. In the point-to-point diagram shown in FIG. 4, CPU 401 can communicate to any of the external devices 310, even if the communication pathway between CPU 401 and an external device 310 includes PCI Express serial switch 300c and PCI Express serial switch 300d in the sequential relationship shown. CPU 401 can open up communication with that external device 310 via switching devices 300. CPU 401, through root complex 302, controls the operations of switching devices 300 and the PCI Express link 306 with external devices 310. Root complex 302 detects and initializes external devices 310, and controls PCI Express link 306 by default. Root complex 302 can retrieve information from external device 310. Upon receiving an instruction from root complex 302, switching devices 300 can route communications directly between external devices 310. External devices 310 can communicate with one another independently and in a peer-to-peer fashion without a master-slave control of either switching devices 300 or root complex 302.

External devices 310, it is noted, can be either endpoint devices or other switching devices such as switching devices 300, such as shown by switching devices 300c and 300d. Endpoint devices can be, for example, printers, digital cameras, add-in cards, USB memory sticks, etc. Other switching devices 300 are often not the end users of communication packets 350 sent to them; they forward the packets to other endpoint devices 310 to which they are connected. As discussed at length above, each external device 310 is assigned to a base address and a limit address. These base addresses are loaded and stored in a global address map and are retrieved as needed by root complex 302 or CPU 401. Root complex 302 then maps these base addresses to the arrays of base address registers 101. The base address contained in each base address register in the arrays of base address registers 101 defines the starting point and memory addresses that each external device 310 has been allocated in the global address map.

Referring again to FIG. 4, the purpose of PCI Express link 306 is to connect external devices 310 to root complex 302 so that the CPU 401, via root complex 302, can communicate with them. Each PCI Express link 306 is composed of one or more lanes, and each lane is capable of transmitting packets in both directions at once. This full-duplex communication is possible because each lane is itself composed of one pair of signals: send and receive.

Referring again to FIG. 4, upon power-up and enumeration process, the operating system, via root complex 302, interrogates the entire PCI Express system 400 by traversing through system topology and locates all external devices 310 that are connected to the switching device 300. After the configuration process is complete, each receiver interface of each external device 310 is prepared to monitor the integrity of new communication packet 350. A transaction layer packet (TLP) can move from one PCI Express link 306 to another PCI Express link 306, using routing information contained in its header.

Referring again to FIG. 4, as a new communication packet 350, in the form of a transaction layer packet (TLP), arrives at ports 307 or 308, switching device 300 checks for errors then determines whether to accept the traffic and use it internally, forward the traffic to the appropriate port 308, or reject the traffic because switching device 300 is neither the intended target nor an interface to it.

Figure 5:
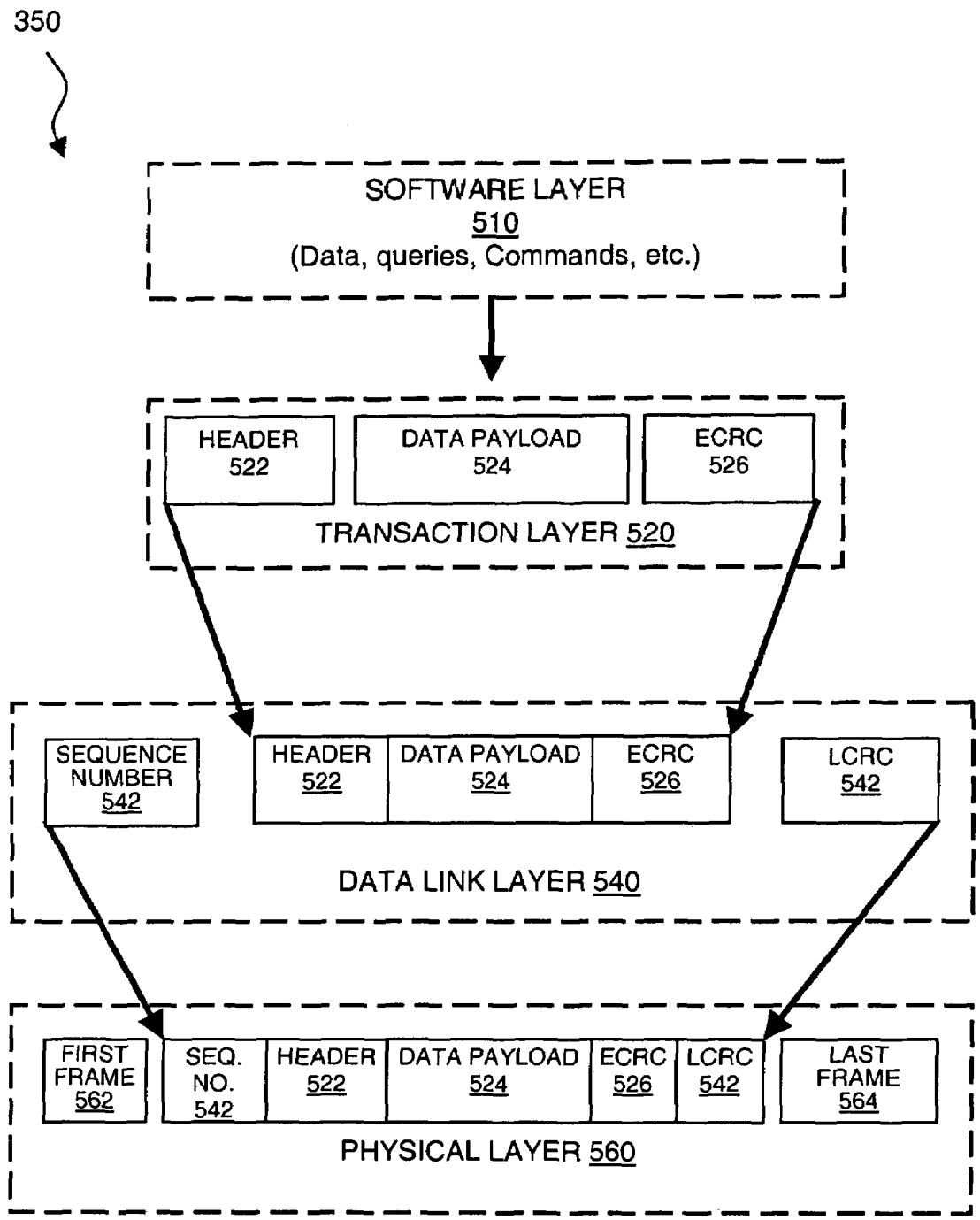
FIG. 5 illustrates a conceptual parsing of a communication packet in a PCI Express system in accordance with an embodiment of the present invention.

Referring now to FIG. 5, different abstract layers of a typical PCI Express communication packet 350 are illustrated. Communication packet 350 can include data, commands, a query or other communication that a software function, software layer 510 in this illustration, intends for some device in the system. A configuration command, reassigning base and limit addresses, it is noted, can be one type of communication packet 350. Data becomes the payload 524 of a data packet. In a configuration command, the payload is a new address or set of addresses for reconfiguration of a base address register in switching device 300.

Referring still to FIG. 5, a transaction layer 520, the operating system for example, applies a header 522 and, possibly, a footer 526, to the data payload 524. Header 522 includes a target address which can be a device address, a port name, or a bus number in the system. In the example of a configuration command packet, the target address is an address internal to switching device 400. Footer 526 is often an End-to-end Cycle Redundancy Checking (ECRC) sequence.

Transaction layer 520 ensures that communication packet 350 is properly routed to its intended destination and that it arrives intact. In the example of a communication packet 350 destined for an external device 310, transaction layer 520 ensures the integrity of communication packet 350 and that it passes intact through switching device 300.

Data link layer 540 is, in this embodiment, the point-to-point function, such as is implemented by switching device 300. The data link layer adds sequence number 542 and a Link Cycle Redundancy Check (LCRC) 546 to the communications packet. Physical layer 560 represents the transmission medium which is responsible for actually transmitting and receiving communication packet 350 across PCI Express link 306. Physical layer 560 adds a first frame 562 and a last frame 564 in addition to sequence number 542, LCRC 546, header 522, data payload 524, and ECRC 526. Link cyclical redundancy check (LCRC) 546 ensures integrity of packet 350 across PCI Express link 306.

It is noted that a switching device in a PCI Express environment can be connected with one or more switching devices at its downstream ports, as shown in FIG. 4, above. If, in this example, the target address of a communication packet 350 indicates a downstream external device and switching device 350 is not the recipient, switching device 300 forwards communication packet 350 to the downstream external device 310. A base address register associated with a downstream switch, it is noted, contains a base address and a limit address fully encompassing the ranges of addresses represented in the base address registers of the downstream switch.

If switching device 300 is not correctly in the path of communication packet 350, the packet is returned to the upstream egress terminal 307E subject to the rules for ordering and flow control for that port. If the target address contained in the header 522 of transaction layer packet 520 does not belong to the range of base addresses of upstream port 407, switching device 400 performs further comparisons and rejects the packet as an Unsupported Request (UR). Thus, transaction layer 540 and other layers carry information and ensure data integrity of communication packet 350 that is necessary to perform the routing process of routing device 10 in switching device 300.

In one embodiment of the present invention where PCI Express system 300 has more than one switching device 300 connected to it, to facilitate communications between two external devices 310 in different switching devices 300, communication packet 350 traverses from the originating external device 310, connected to one switching device 300 all the way up to the lowest common switch point. New communication packet 350 is then traverses down to the destination external device 310. When the source and target reside on different segments of PCI Express link 306, communication packet 350 must be routed up toward root complex 302 to the segment of PCI Express link 306 where the base address ranges of the source and the target external devices 310 intersect, and then routed down to the target external device 310. As a result, address based routing exploits the shortest paths that exist in a switched-packet interconnect fabric.

Figure 6:
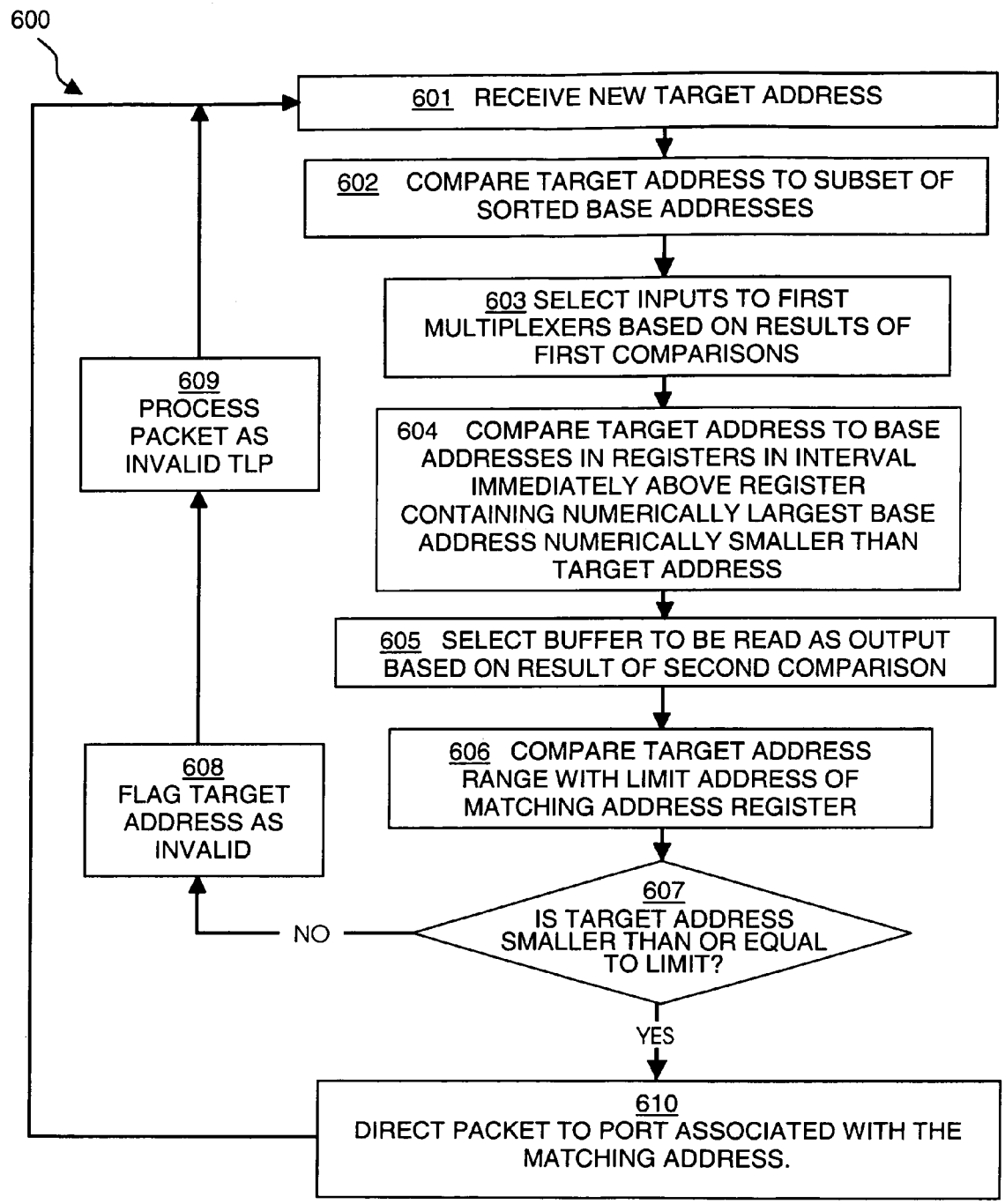
FIG. 6 illustrates a flow diagram of a method for base address matching in a switching device in accordance with an embodiment of the present invention.

FIG. 6 illustrates a method for rapid binary base address search in accordance with an embodiment of the present invention. Method 600, implemented by routing device 10 in switching device 300, begins by receiving a communication packet 350 containing a new target address 601. The target address can be a memory address, a pre-fetchable memory address or an I/O address, or a bus or device or function number. The new target address is received and held in a register/buffer 150.

The new target address is then compared 602 to a subset of sorted base addresses in an array of base address registers. this comparison is a "greater-than" comparison. The subset of registers consists, in this embodiment of the present invention, of registers selected at relatively equal intervals in the array of base address registers, as discussed at length in reference to FIG. 2A, above. The sorting of base addresses, it is noted again, is disclosed and described in detail in co-pending patent application Ser. No. 11/395,918, as related previously. The comparing with the selected subset of base address registers is accomplished by first-phase comparators 120-122, as discussed in reference to FIG. 2A.

In step 603, the outputs of first-phase comparators 120-122 are used to select the inputs to second-phase multiplexers 130-133. These selected inputs are the contents of the base address registers in the interval of base address registers that is determined by the first comparison in step 602. The selected inputs to second-phase multiplexers 130-133 allow the contents of the selected base address registers to be written into buffers 134-137.

The contents of buffer 134-137 are then compared in step 604 by second-phase comparators 138-141 to the new target address in buffer 150. Again, these contents are the contents of the base address registers selected in the first-phase comparison of step 602. The second phase comparison is a "greater-than-or-equal-to" comparison.

In step 605, the buffer, of buffers 134-137, is selected that contains the specific base address register contents containing the matching base address, if one exists. The buffer contents are read as the output of the selecting multiplexer 142.

In step 606, the target address is compared in the limit check validation circuit 104 to ensure it does not exceed the upper bound of addresses assigned to the selected base address register. The upper bound is established, in this embodiment, by the limit address. It is noted that a limit address can be identical to a base address.

If, in step 607, the target address range is not valid, the target header is flagged 608, and the packet is processed as an invalid packet 609. The routing device is enabled to receive another communication packet with a new target address, 601.

If, in step 607, the target address range is valid, the communication packet is routed 610 to the port whose number is associated with the matching address discovered in steps 602 through 605. In the case where the target address is a bus number, the packet is routed to the port connected to, or in the path to, the numbered bus.

It is noted here that the above disclosed address matching device and method can, in another embodiment, be implemented as a limit address matching method and device. The device and method for matching on a limit address are as described above for base address matching, with the exception that the address loaded into buffers and used for comparison is the limit address stored in the base address register versus the base address. The above detailed description applies to embodiments of the present invention, whether the base address or the limit address is used for search and matching.

A base address matching device and method have been disclosed. In a switching device having a plurality of input/output ports, a routing device has been described that has an array of registers in which each register holds content associating an address with one of the input/output ports in the switching device and elements of the content in the array of registers are pre-sorted into a specified order, and an address matching element that has a plurality of comparators that are electrically coupled to selected registers in the array of registers. The base address matching element is able to select a matching address from the content of the array of registers and to direct a communication packet to one of the ports in the switch by matching the target address in the packet to an address in the content of the register in the array of registers associated with the port.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. In a switching device comprising a plurality of input/output ports, a routing device, comprising:

an array of registers wherein each register comprises content associating an address with one of said input/output ports in said switching device;

an address sorting device coupled to the array of registers for pre-sorting the content of the array of registers into either a descending or ascending order; and an address matching element coupled to each register in said array of registers and coupled to the address sorting device wherein said address matching element is enabled to direct a communication packet to one of said ports associated with an address register of interest in said switch by comparing a target address in said communication packet to the content of said array of registers to identify the address register of interest associated with one of said ports, wherein said address matching element includes logic to sequentially compare the target address to the content of the array of registers beginning at the logically topmost address register in the array of registers and continuing in descending order through the array of registers, and:

if the array of registers are pre-sorted into a descending order, identifying the address register of interest as the first address register encountered in the array of registers whose address is smaller than the target address, or;

if the array of registers are pre-sorted into an ascending order, identifying the address register of interest as the first address register encountered in the array of registers whose address is larger than the target address.

2. The routing device described in claim 1, wherein said content of said array of registers comprises a base address.

3. The routing device described in claim 1, wherein said target address in said packet is an address range.

4. The routing device described in claim 1, wherein said content of said array of registers comprises a limit address.

5. The routing device described in claim 4, wherein said target address is determined to be valid if said target address is numerically greater than or equal to said base address and said target address is numerically less than or equal to said limit address.

6. The routing device described in claim 1, wherein said content of said array of registers comprises a port name.

7. The routing device described in claim 1, wherein said content of said array of registers comprises a bus name.

8. The routing device described in claim 1, wherein said address matching element further comprises:
a first selector comprising a plurality of comparators, wherein each of said comparators is electrically coupled to a register in said array of registers at intervals comprising registers, and wherein the number of registers between each register coupled to said comparators in said set of registers establishing said intervals is equal; and
a second selector electrically coupled to said first selector and to a switch core in said switch and comprising a plurality of comparators, each of said comparators being electrically coupled to the output of a multiplexer in a plurality of multiplexers, wherein each comparator in said plurality of comparators in said first selector is enabled to determine which interval of registers has the highest probability of including a register containing a matching address and wherein each of said comparators in said plurality of comparators in said second selector includes logic to:
accept an output from one of said multiplexers;
compare said output to said target address; and
cause the selection of an input to a multiplexer, based on the result of said comparing.

9. The routing device described in claim 8, wherein each of said intervals of registers between each of said registers coupled to said comparators is the number of registers equal to the binary logarithm of the total number of ports comprised in said switch.

10. The routing device described in claim 8, wherein each multiplexer in said plurality of multiplexers in said second selector is enabled to accept an input from a register in each of said intervals of registers.

11. The routing device described in claim 8, wherein each comparator in said plurality of comparators in said second selector is enabled to compare said target address with an address contained in a register in one of said interval of registers selected by said first selector.

12. A switch for rapid packet switching, comprising:
a plurality of input/output ports;
an array of registers electrically coupled to each of said input/output ports, wherein each register comprises content associating an address with one of said ports, and wherein said content in said array of registers is pre-sorted into specified order;
a first selector comprising a plurality of comparators, wherein each of said comparators is electrically coupled to a specific set of registers in said array of registers, and wherein the number of registers between each coupled register in said set of registers is equally allotted between each of said comparators;
a second selector electrically coupled to said first selector and to a switch core in said switch and comprising a comparator, wherein each comparator in said plurality of comparators in said first selector is enabled to simultaneously scan said specified set of registers and wherein said comparator in said second selector is enabled to select an output from a comparator in said plurality of comparators in said first selector and to direct said packet to a port in said switch based on said output.

13. The switch described in claim 12, wherein each of said comparators in said plurality of comparators is enabled to scan said specific set of registers in descending order of the content of said registers.

14. The switch described in claim 12, wherein said descending order of the content of said registers is a descending order of base addresses in said registers.

15. The switch described in claim 12, wherein the interval between each of said registers in said specific set of registers electrically coupled to each of said comparators in said plurality of comparators is the number of registers derived from a logarithmic function of the total number of ports comprised in said switch.

16. The switch described in claim 12, wherein the register containing contents comprising said matching address is determined by the binary addition of the outputs of each of said comparators in said plurality of comparators.

17. A method for address matching a target address with an address of interest in an address register of interest in an array of address registers in a switch, comprising:
pre-sorting the addresses in the array of registers into either a descending or ascending order;
receiving the target address in a communication packet;
comparing the target address in the communication packet to the addresses in the array of registers to identify the address register of interest by sequentially comparing the target address to the content of the array of registers beginning at the logically topmost address register in the array of registers and continuing in descending order through the array of registers, and:
if the array of registers are pre-sorted into a descending order, identifying the address register of interest as the first address register encountered in the array of registers whose address is smaller than the target address, or;
if the array of registers are pre-sorted into an ascending order, identifying the address register of interest as the first address register encountered in the array of registers whose address is larger than the target address
locating the address of interest in the address register of interest in said array of registers;
determining said address of interest to be a valid address; and
directing said packet to a port associated with said valid address of interest.

18. The method for address matching described in claim 17, wherein said comparing comprises comparing said target address to a specific subset of sorted addresses in said array of registers by use of a plurality of comparators enabled to cause a selection of an input to a multiplexer and wherein each address in said subset is contained in a register located an equal number of registers from other registers in said array of registers containing other addresses in said specified subset of base addresses.

19. The method for address matching described in claim 18, wherein said equal number of registers is an interval in said array of address registers derived from a logarithmic function of the total number of address registers in said array of address registers.

20. The method for address matching described in claim 18, wherein the addresses are base addresses.

21. The method for address matching described in claim 20, wherein said comparing further comprises comparing said target address to the sorted base addresses contained in the registers comprising the interval of registers immediately above the register containing said numerically largest base address that is numerically less than or equal to said target address, in an additional plurality of comparators.

22. The method for address matching described in claim 17, wherein the addresses are base addresses and wherein said determining said address of interest to be a valid address is accomplished by determining that a limit address associated with said base address is numerically greater than or equal to said target address.

* * * * *